Figure 1:
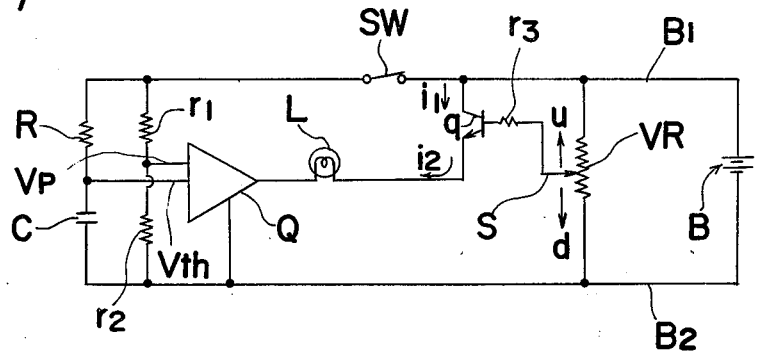

United States Patent [19]
Fujita et al.

[11] 4,074,294
[45] Feb. 14, 1978

[54] DATA RECORDING MEANS FOR PHOTOGRAPHIC CAMERA

[75] Inventors: Susumu Fujita, Kobe; Seijiro Kushibe, Nishinomiya, both of Japan

[73] Assignee: Fuji Photo Film Co., Ltd., Minami-ashigara, Japan

[21] Appl. No.: 723,342

[22] Filed: Sept. 15, 1976

[30] Foreign Application Priority Data
Oct. 28, 1975 Japan .................... 50-130064
Jan. 26, 1976 Japan .................... 51-7375

[51] Int. Cl.$^2$ ............................... G03B 17/24
[52] U.S. Cl. .................................... 354/106
[58] Field of Search ............... 354/60 L, 105, 106, 354/107, 108, 109; 355/40; 250/476

[56] References Cited
U.S. PATENT DOCUMENTS

| | | | |
|---|---|---|---|
| 3,739,697 | 6/1973 | Miyagawa | 354/108 |
| 3,812,508 | 5/1974 | Matsuda | 354/106 |
| 3,889,281 | 6/1975 | Taguchi | 354/105 X |
| 3,966,857 | 10/1972 | Wagner et al. | 354/60 L |

Primary Examiner—L. T. Hix
Assistant Examiner—M. L. Gellner
Attorney, Agent, or Firm—Sughrue, Rothwell, Mion, Zinn and Macpeak

[57] ABSTRACT

A data recording system is disclosed in which level of intensity of light emitted by a light source to illuminate selected items of data on a data carrier to permit projection of the image of the data onto film material simultaneously with exposure of the film material to imagewise light from an external scene is automatically made higher or lower as camera shutter speed is increased or decreased. The total amount of light emitted by the light source and allowed to reach the film material is maintained generally constant and recording of data is effected efficiently at all shutter speeds.

6 Claims, 5 Drawing Figures

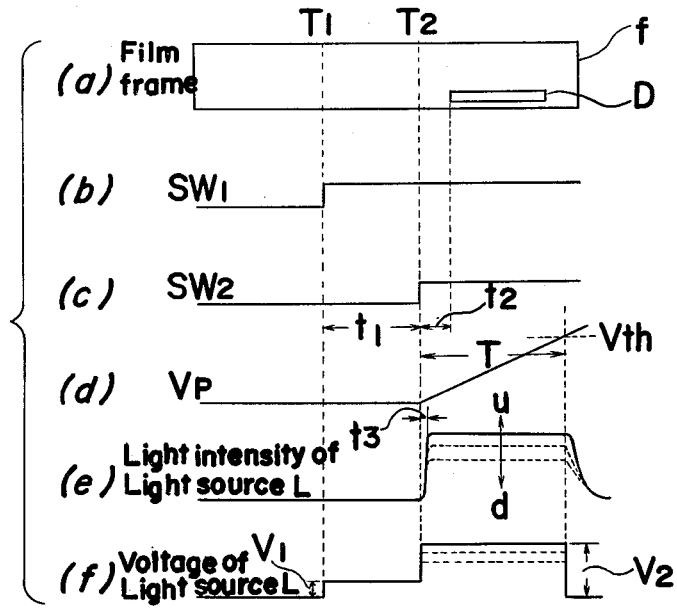
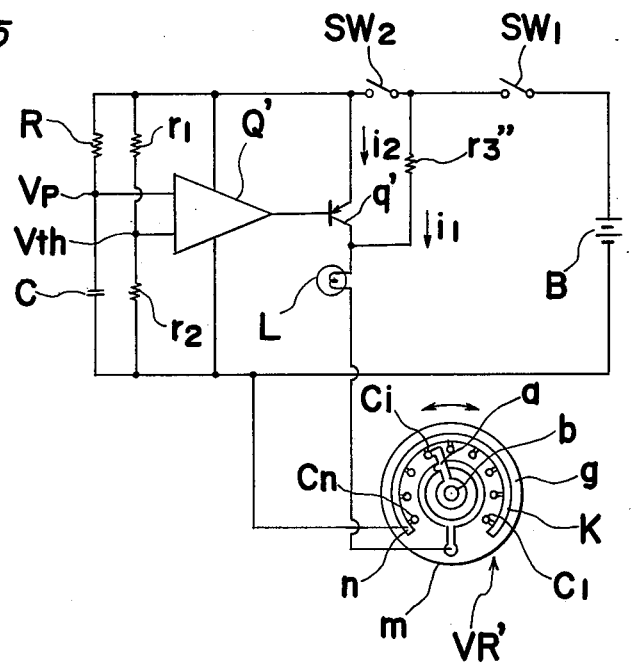

DATA RECORDING MEANS FOR PHOTOGRAPHIC CAMERA

The present invention relates a data recording means employable in a camera to permit the date or other items of data to be recorded simultaneously with photographs. More particularly the invention relates to a data recording means in which the quantity of light for exposure of film material to the image of data items is maintained generally constant, irrespective of shutter speed.

It is known to provide a camera with a data recording means which consists basically of a data carrier means provided inside the camera, an externally actuable data setting means which may move the data carrier means to bring different items of data carried thereby to a projection position, and a data projection system by which, when the camera shutter is actuated, the image of a data item or items currently at the projection position is projected image of particular items of data onto a frame of film material positioned at an exposure station whereat the film frame may be exposed to light reflected from an external scene to be photographed.

The projection system of the data recording means comprises an optical system for directing a focussed image of a data item or items onto a data recording location on the film frame, i.e., the portion of the film frame on which it is required to record data, and must of course also include a light source which illuminates data at the data projection position only when the camera shutter is actuated. The light source may be external light, in which case there is provided a dormer window element or similar means, via which external light may be directed onto data at the data projection position, and associated slave shutter means which is normally closed and which is opened upon actuation of the main camera shutter constituting part of the camera system for exposure of film. However, in this case provision of the slave shutter means, which must be linked to the camera main shutter, makes camera construction rather complicated, and there is also the disadvantage that since scenes of varying degrees of brightness are photographed, and since the data projection system is much smaller than, and therefore has much less light-gathering ability than, the camera exposure system, there may be occasions when there is insufficient light to effect efficient recording of data on film. This is particularly so when very high shutter speeds are selected.

Alternatively, the light source may be an artificial light source, suitably a tungsten filament lamp, which is provided inside the camera and which is normally unactuated but is actuated momentarily during actuation of the camera main shutter. Employment of such a light source presents the advantage that camera construction is greatly simplified since an extra shutter means and associated linkage elements are unnecessary.

Since a camera shutter is a mechanically moving element which with respect to image-wise light gradually uncovers and then again covers successive portions of a film frame it is necessary that the light source be actuated during at least part of the time during which the film frame portion carrying the data recording location is uncovered, i.e., actuation of the light source must be timed with shutter movement. This is usually, and most simply effected by providing in connection with the camera shutter a lever or similar means which, when the shutter reaches a certain point in its travel to uncover successive portions of a film frame, closes a switch means and thereby closes the actuation and control circuit of the light source. For example, if the shutter employed in the camera is a focal plane shutter, the light source is actuated shortly before the trailing edge of the 1st shutter curtain reaches a position to uncover the film frame portion carrying the data recording location, it being necessary to initiate actuation of the light source before the data recording location is uncovered since actuation of the light source is not instantaneously effective, but a certain amount of time is required before efficient emission of light by the light source is achieved. A further requirement regarding the light source is that duration of emission of light thereby be limited to a certain maximum period of time, since otherwise there is liable to be over-exposure of the data recording location when shutter speed is comparatively slow, a slow shutter speed being typically of the order of onesixtieth of a second or longer. This limitation may be achieved by including in the light source control circuit a suitable timing circuit or element which terminates light source actuation within a certain time from commencement of light source actuation.

When slow-to-medium shutter speeds are selected this set duration of light source actuation extends over the entire time during which the data recording location on the film frame is uncovered, and of course as shutter speed is increased duration of light source actuation gradually becomes longer with respect to the time the data recording location is uncovered. At high shutter speeds the length of time during which the data recording location is exposed to light projected thereonto and carrying the image of data at the data projection station is essentially independent of the duration of light source actuation, and is equal to the very short time that the data recording location is uncovered by the camera shutter. In conventional data recording means, this results in the disadvantage that the total amount of image-wise light projected onto the data recording location, is insufficient to ensure production of an easily readable data record on a completed photographic print.

It is theoretically possible to overcome this problem by employing a light source which emits light at a high level of intensity and is actuated for a very short time, but such a light source demands provision of very complex means to permit the light source control circuit to be closed when, space-wise, the camera has reached different points in its travel, since if light source actuation is of very short duration and is always effected when the shutter reaches the same point in its movement, at slow to medium shutter speeds action of the light source is liable to be completed before the data recording location has been uncovered, or while the data recording location is or has been only partially uncovered.

The problem of under-exposure of the data recording location at high shutter speed is often further aggravated because, particularly when the light source is a means such as a tungsten filament lamp, the light source fails to reach peak emission of light between the time the light source power supply circuit is closed and the time uncovering of the data recording location commences. This problem can be countered by employing a light source which has a comparatively fast response to actuation input, for example a light-emissive diode, although in a large camera such a device is not generally capable of emitting light at a sufficiently high level of intensity to ensure efficient exposure of the data recording location, or by disposing the means for closure of the light source power supply circuit in such a manner that the camera shutter actuates this closure means at an earlier point of shutter travel. However, since duration of light source actuation must be kept to a definite maximum for the abovenoted reasons, such a solution again entails the disadvantage that there is liable to be failure to achieve correct recording of data on the film frame when low shutter speeds are selected.

This problem of determining the optimum point of shutter travel at which actuation of the light source should commence and also the problem of determining what the optimum level of intensity of light emitted by the light source should be for efficient data recording throughout the complete range of shutter speed are further complicated by the fact that films having different speed ratings, i.e., sensitivity to light, and so requiring a lesser or greater amount of light in order to effect recording of data thereon, may be employed in one and the same camera.

It is accordingly a principal object of the invention to provide an improved data recording means which permits efficient recording of data on film material irrespective of the speed at which the shutter of a camera incorporating the data recording means is actuated.

It is a further object of the invention to provide a data recording means which accurately ensures effective emission of light by a light source incorporated therein at a required time, even when the light source employed is a device having a comparatively slow response to actuation input.

It is another object of the invention to provide a data recording means which permits level of intensity of light emitted by a light source included therein to be selectively altered in accordance to the sensitivity to light of film material employed for taking photographs.

In accomplishing these and other objects there is provided according to the present invention a data recording means in which the duration of actuation of a light source constituting part of a data projection system is maintained constant for all shutter speeds by a timing element included in the light source power supply circuit, and power to actuate the light source is supplied through a supply adjustment circuit including a variable-setting element which may control current flow through the power supply circuit, this variable-setting element suitably being a variable resistor which is connected to a camera means for setting shutter speed and is adjusted to present a lesser or greater resistance as the selected shutter speed is higher or lower, whereby a larger or smaller current flows in the power supply circuit and the level of intensity of light emitted by the light source is made higher or lower as shutter speed is increased or decreased.

Thus, there is provided a data recording means which has an extremely simple construction, but thanks to which, without any special action on the part of a photographer being necessary, the total amount of light which carries the image of data currently at a data projection position and is directed onto the data recording location of a film frame is maintained effectively constant, whatever the shutter speed, and recording of data is therefore always efficiently effected.

If the light source employed is a slow-response device, the power supply circuit therefor includes a preheating power supply circuit which is closed immediately subsequent to start of shutter movement effected in order to expose a film frame, and which supplies a small preheating input to the light source, which may therefore rapidly reach a peak level of light emission upon subsequent supply of a main actuation input thereto.

According to another embodiment of the invention the variable-setting element controlling rate of power supply to the light source comprises by a variable resistor element having a slider which remains in the camera in connection with the shutter-speed setting means of the camera and one of a number of interchangeable resistance elements which for any particular amount of movement of the slider insert different values of resistance in the light source power supply circuit, and each of which may be selectively employed in order to cause activation of the light source in the manner best suited to film having a particular sensitivity to light.

Figure 2:
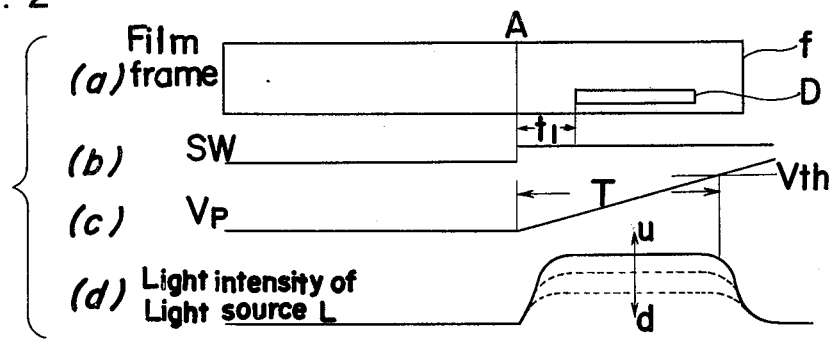
Figure 3:
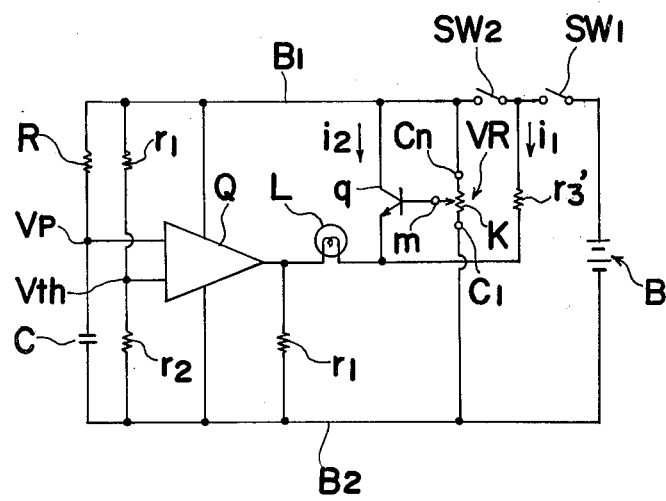

A better understanding of the present invention may be had from the following full description of several preferred embodiments thereof when read in conjunction with the attached drawings in which like numbers or reference letters refer to like parts, and FIG. 1 is a circuit diagram of a light source power supply circuit employed in a data recording means according to a 1st embodiment of the invention;

FIG. 2, (a) to (d), is a timing chart illustrating action of the means of FIG. 1;

FIG. 3 is a circuit diagram of a light source power supply circuit employed in another embodiment of the invention;

FIG. 4, (a) to (f), is a timing chart illustrating action of the means of FIG. 3; and FIG. 5 is a circuit diagram of a light source power supply circuit employed in another embodiment of the invention.

Referring to FIG. 1, there is shown a circuit for supply of power to a light source L which is located inside a camera and which in terms of camera construction is forward of a data projection position to which items of data on a data carrier means, not shown, may be brought upon suitable actuation of an externally actuable data setting means of conventional type, not shown. The light source L is normally unactuated, and when actuated illuminates data currently at the data projection position, whereupon the image of this data is projected, via a suitable known optical system, not shown, to the data recording location D of a film frame f, not shown in FIG. 1, which is currently at an exposure station in the camera. The source of power for activation of the light source L is suitably a battery B whose positive terminal connects to a line B1 and whose negative terminal connects to a line B2.

Provided in parallel to the battery B across the lines B1 and B2 there is provided a variable resistor VR whose slider s connects through a voltage-limiting resistor r3 to the base of an NPN transistor q. The transistor q is in a series string which also includes the light source L and a threshold detector Q and is disposed across the lines B1 and B2 in parallel to the variable resistor VR, the collector of the transistor q being connected to the line B1 and the emitter thereof being connected to one terminal of the light source L, and the other terminal of the light source L being connected through the threshold detector Q to the line B2.

The threshold detector Q may receive a reference or threshold input Vth from the junction of two resistors, r1 and r2, constituting a voltage divider provided across the lines B1 and B2 in parallel to the battery B and may also receive a comparison input Vp from the junction of a resistor R and a capacitor C which are in series with one another and so constitute a voltage divider and which are respectively provided on the line B1 and the line B2, the junction of the resistor R and capacitor C also constituting the junction of the lines B1 and B2.

On the line B1 there is provided a normally open switch SW, which, as described in greater detail below, is closed when the camera shutter means reaches a particular point of shutter travel during actuation of the shutter means to expose the film frame $f$ at the exposure station to image-wise light reflected from an external scene.

Thus, when the switch SW is closed, a constant threshold voltage Vth is supplied to one input terminal of the threshold detector Q, and, while the capacitor C is being charged, a steadily rising comparison voltage $Vp$ is supplied to the other input terminal of the threshold detector Q. Until the value of the comparison voltage $Vp$ reaches that of the threshold voltage Vth, the threshold detector Q allows current to pass and the power supply circuit to the light source L consisting of the battery B, the transistor $q$, the light source L itself, and the threshold detector Q is closed, base bias to the transistor $q$ being supplied via the slider $s$ of the variable resistor VR, and the light source L therefore lights. When the comparison voltage $Vp$ reaches the value of the threshold voltage Vth, the threshold detector Q stops passage of current, and the light source L therefore goes out, the threshold detector Q and associated elements supplying input thereto thus acting as a timing switch.

The threshold detector Q may of course have various constructions in order to accomplish the abovedescribed switching action. For example, the detector Q may include a comparison circuit which compares the inputs V$th$ and V$p$ and produces an output only when there is a difference between these inputs, and may also include a circuit which may provide connection between the light source L and the line B2, and provides this connection only when the comparison circuit produces an output, i.e., only when the inputs V$th$ and V$p$ are unequal.

The slider $s$ of the variable resistor VR is connected to an externally actuable shutter-speed dial or similar shutter-speed setting means, not shown, with which the camera is provided in order to permit a photographer to set the speed of shutter action to different values in accordance with technical requirements of photographing different scenes, the connection between the variable resistor slider $s$ and the shutter-speed dial being such that when a higher shutter speed is selected the slider $s$ is moved towards the upper end of the variable resistor VR, i.e., the end of the variable resistor VR which connects via the line B1 to the positive terminal of the battery B. The transistor $q$ and variable resistor VR thus constitute a circuit for adjustment of power supply to the light source L, since when the selected shutter speed is higher the positive bias to the base of the transistor $q$ is increased, resulting in increased flow of current through the transistor $q$ and also through the light source L in the emitter circuit of the transistor $q$, and therefore the level of intensity of light emitted by the light source L is higher, whereas if the selected shutter speed is lower, forward bias of the base of the transistor $q$ with respect to the emitter thereof is lowered, less current flows through the transistor $q$, and intensity of light emitted by the light source L is therefore at a lower level.

Referring to FIG. 2, the sequence of actions of the abovedescribed means in effecting recording of data on film material is as follows. It is supposed that the shutter of the camera is a focal plane shutter, although needless to say the principles of action of the data recording means are the same if another type of shutter is employed. Upon actuation of a shutter release means, the shutter starts moving across a plane parallel to the plane of a film frame $f$ positioned at an exposure station, so uncovering successive portions of the film frame $f$. Presuming the data recording location D on the film frame $f$ is on a portion of the film frame $f$ which is uncovered at a later stage of shutter action, the data recording means is not actuated during initial movement of the shutter, but when the trailing edge of the 1st curtain of the shutter comes level with a portion of the film frame $f$ near to the data recording location D, i.e., shortly before the data recording location is uncovered, a lever projection or similar element attached to or contactable by the shutter itself or a portion of the shutter actuation mechanism contacts and closes the switch SW, as indicated at A in FIG. 2.

Hereupon, current commences to flow throughout the entire power supply circuit of the light source L, the comparison input V$p$ to the threshold detector Q steadily rising to the level of the threshold voltage input V$th$ to the threshold detector Q, and current flowing in the power supply adjustment circuit, and hence brightness of the light source, rise to a peak value determined by the setting of the slider S of the variable resistance VR, and remain at this value until input V$p$ to the threshold detector Q becomes equal to input V$th$, at which time the threshold detector Q stops passing current, and supply of power to the light source L is terminated. After this emission of light by the light source L rapidly falls to zero. The point A of shutter travel at which the switch SW1 is closed is suitably such that even at the highest shutter speed selected the transistor $q$ may rech peak conduction as determined by the base bias set by the variable resistor VR and emission of light by the source L may reach a peak level within the period of time $t1$ extending from closure of the switch SW1 and arrival of the trailing edge of the 1st curtain at the edge of that portion of the data recording location D which is first uncovered by the camera shutter. Values of elements in the timing circuit are made such that the period of time T during which the light source power supply circuit remains closed is sufficient to ensure that emission of light by the light source L remains at a peak level until all portions of the data recording location D at medium and high shutter speeds, and also that at very slow shutter speeds the light source L remains actuated no longer than is necessary to effect efficient exposure of the data recording location D.

As noted earlier, at high shutter speeds, the length of time the data recording location D is exposed to light from the light source L is determined essentially by shutter speed, and is very short when shutter speed is high. However, since current flow through the transistor $q$ is automatically adjusted as shutter speed is adjusted the level of intensity of light emitted by the light source L also is adjusted this level being maximum for maximum shutter speed, as indicated by the solid line portion of the line ($d$) in FIG. 2, and lower for slower shutter speeds as indicated by the dotted line portions of the line ($d$) of FIG. 2, i.e., the intensity of light emitted by the light source L is made inversely proportional to the length of time this light is allowed to fall on the data location D. Therefore the product obtained by multiplying intensity of light from the light source L and duration of exposure of the data recording location D to this light, i.e., the total amount of light falling on the data recording location D, remains essentially the same at all shutter speeds, thus ensuring that data is always accurately recorded on photographs.

Needless to say, the abovedescribed means may be modified in various ways, for example by providing another type of timing circuit to control duration of actuation of the light source L, without departure from the principles of the invention.

If the light source L employed is a device such as a tungsten filament lamp which has a comparatively slow response to actuation input, at high shutter speeds the period of time $t1$ between closure of the switch SW and commencement of uncovering of the data recording location D may be insufficient for emission of light by the light source L to reach the peak level currently determined by the variable resistor VR, with the result that the total amount of light falling on the data location D may be less than the amount required for correct exposure of the data recording location D. This problem is simply resolved in another embodiment of the invention shown in FIG. 3, to which reference is now had.

In this embodiment, the power supply circuit of the light source L comprises a preheating power supply circuit via which low-level power may be supplied to the light source L independently of power supplied thereto by the power supply adjustment circuit. The preheating power supply circuit is a simple series circuit consisting of the battery B, a normally open switch SW1 provided on the line B1, a resistor $r3'$ having an upper end connected to the line B1 and a lower end connected to one terminal of the light source L, and a resistor $r4$ having an upper end connected to the opposite terminal of the light source L and a lower end connected to the line B2. The resistance values of the resistors $r3'$ and $r4$ are made such that the current $i1$ which may flow in the preheating power supply circuit is very small, and may heat the tungsten filament of the light source L slightly, but not to a degree to cause detectable emission of light.

Apart from the fact that the threshold detector Q is connected directly to both lines B1 and B2, the power supply adjustment circuit through which a comparatively large current $i2$ may flow to actuate the light source L has the same general construction as described in reference to the 1st embodiment and is closed upon closure of a normally open switch SW2 which is provided on the line B1 between the point of connection of the resistor r3' to the line B1 and the point of connection of the variable resistor VR to the line B1. With this configuration therefore the preheating power supply circuit may be closed by closure of the switch SW1 only, but the power supply adjustment circuit is not closed until the switch SW2 also is closed. Both switches SW1 and SW2 are closed in a suitable manner upon actuation of the camera shutter, the switch SW1 being so located that it is closed almost immediately after commencement of shutter action, and the switch SW2 being closed shortly before the camera shutter commences to uncover the data recording location.

The sequence of actions in the data recording means according to this embodiment is as shown in FIG. 4, to which reference is now had. Upon depression of a shutter button or similar actuation means, the shutter begins to move across the plane of the film frame $f$, and after moving a short distance actuates the switch SW1, switch SW2 being still unactuated at this time. Hereupon a small voltage V1 is applied to the light source L and serves to heat the tungsten filament of the light source L. When the shutter has moved a further distance, the switch SW2 is closed, whereupon the voltage applied to the light source is stepped up to a value V2, which is at a level currently determined by the setting of the variable resistor VR and is in all cases sufficient to cause the light source L to emit light. The positions of the switches SW1 and SW2 are such that the period of time $t1$ extending between the time T1 when the switch SW1 is closed and the time T2 when the switch SW2 is closed is long enough to effect sufficient preheating of the light source L to permit the light source L to reach the requisite level of light emission within a period of time $t3$ which commences with closure of the switch SW2 at time T2 and is shorter than the period of time $t2$, which is the period of time extending between time T2 and commencement of uncovering of the data recording location D. The time required for the input Vp to the threshold detector Q to become equal to the input V$th$ is sufficient to allow the camera shutter to move completely past the data recording location, as in the 1st embodiment, and power supply to the light source L is terminated when input Vp equals input V$th$. Upon termination of shutter action, both the switches SW1 and SW2 are allowed to return to normal, unactuated positions, the data recording means thus being made ready for recording of data on a subsequently exposed film frame $f$.

Referring now to FIG. 5, there is shown another embodiment of the invention according to which the level of intensity of light emitted by the light source L may be also adjusted in accordance with ASA or DIN ratings of different types of film employed in a camera. In this embodiment, the light source power supply circuit includes a preheating power supply circuit which is a series circuit consisting of the battery B, a normally open switch provided on the line B1, a resistor $r3''$, the light source L and a variable resistor VR having one end $m$ connecting to the light source L and an opposite end $n$ connecting to the negative terminal of the battery B through the line B2.

The variable resistor VR' is constituted by a wiper arm $a$ made of conductive material and having one end fixedly mounted on a rotatable shaft $b$, which is connected to and rotated simultaneously with movement of the shutter-speed setting means, and a flat, circular support element $g$ which carries an arcuate continuous resistance element $k$ having integrally attached thereto at set intervals contact studs c1 to cn different ones of which are contacted by the wiper arm $a$ as a result of the shaft $b$ being turned to different positions when the shutter-speed setting means is moved to select various shutter speeds. The wiper arm $a$ connects to the end $m$ of the variable resistor VR' through a fixed element of conductive material which suitably also constitutes a bearing support of the shaft $b$. The end of the resistance element $k$ nearest to the contact stud cn is connected to the end $n$ of the variable resistor VR'. Thus, the resistance inserted in the light source power supply circuit by the variable resistor VR' decreases as the contact stud $ci$ contacted by the wiper arm $a$ is closer to the contact stud cn. The shaft $b$ is rotated anticlockwise as seen in the drawing and the wiper arm $a$ is moved towards the contact stud cn as higher shutter speeds are set by the shutter-speed setting means.

When the switch SW1 is closed, there flows in the preheating power supply circuit a current $i1$ whose value is of course to some extend dependent on the setting of the variable resistor VR', but which is determined principally by the resistor $r3''$, which suitably represents a resistance much greater than the maximum resistance which may be inserted into the circuit by the variable resistor VR'.

The power supply adjustment circuit is a series circuit including the battery B, the variable resistor VR', and a PNP transistor $q'$ whose collector connects to the light source L and whose emitter connects to the line B1, a normally open switch SW2 which is provided on the line B1 between the points of connection of the collector $q'$ emitter and of the resistor $r3''$ to the line B1, and the normally open switch SW1.

Base bias is supplied to the PNP transistor $q'$ by a threshold detection unit Q' to which when both switches SW1 and SW2 are closed a threshold input $Vth$ and a comparison input $Vp$ are supplied in the same manner as described above in reference to the 1st embodiment of the invention, and which is connected to the positive terminal of the battery B through the line B1 and switches SW1 and SW2 and directly to the negative terminal of the battery B through the line B2. Subsequent to closure of both switches SW1 and SW2, as long as the input $Vp$ to the threshold detection unit Q' is lower than the input $Vth$ the threshold detection unit Q' maintains voltage applied of the base of the transistor $q'$ generally equal to that of the negative terminal of the battery B, whereby the transistor $q'$ is made conductive, and when input $Vp$ becomes equal to input $Vth$, the threshold detection unit Q' immediately changes the voltage applied to the transistor $q'$ base to a level generally equal to that of the positive terminal of the battery B, so cutting off the transistor $q'$. When the transistor $q'$ conducts, brightness of the light source L depends on the setting of the variable resistor VR', since the value presented by the variable resistor VR' is comparable with that of the other resistances in the power supply adjustment circuit, consisting principally of the resistance of the light source L, and variation of the setting of the variable resistor VR' immediately alters the current $i2$ which may flow in the circuit. The switches SW1 and SW2 are actuated by the camera shutter in the same manner as described in reference to FIG. 3, action of this other embodiment of the invention thus being generally the same as indicated in the timing chart of FIG. 4.

The support element $g$ carrying the resistance element $k$ may be replaced by one of a series of support elements $g$ all of which have an identical construction but each of which carries a resistance element $k$ which for any given setting of the wiper arm $a$ inserts into the power supply adjustment circuit a value of resistance different from that inserted by the resistance elements $k$ on other support elements $g$. The range and graduation of resistance values insertable into the circuit by any one resistance element $k$ are made optimum for films having speed ratings within a specific range, it thus being made possible to ensure even closer control over emission of light by the light source L and hence even more efficient recording of data on film material.

What is claimed is:

1. In a data recording means employed in a camera to record data items on photgraphic film material located at an exposure station in said camera simultaneously with exposure of said film material to image-wise light reflected from an external scene upon actuation of a shutter means having associated therewith a shutter speed setting means externally actuable and movable to different settings to cause exposure action of said shutter means to be effected at different speeds and comprising a data carrier means movable by externally actuable means to bring successive items of data carried thereby to a projection position and a data projection system able to project the image of data items located at said projection position onto a specific portion of said film material and including a light source which with respect to said camera construction is located forward of said data carrier and which when actuated may illuminate data items located at said data projection position, said image of said data items being projectable by said projection system onto said film material only when said light source is actuated, and a light source actuation system for actuation of said light source during action of said camera shutter means, a data recording means wherein said light source actuation system comprises a normally open power supply circuit which when closed supplies power to said light source, and includes a power source, a power supply adjustment circuit which at least includes an adjustable-setting element connected to, and movable to different settings simultaneously with, said shutter speed setting means, movement of said adjustable-setting element being proportional to that of said shutter speed setting means, and which causes said power to be supplied to said light source at a rate proportional to the shutter speed set by said shutter speed setting means, said power supply rate being made higher or lower as said set shutter speed is made higher or lower, and a timing circuit which stops said power supply after elapse of a set time from closure of said power supply circuit; and a normally unactuated power supply circuit closure means which is actuated to close said power supply circuit during said exposure action effected by said shutter means.

2. Data recording means as claimed in claim 1 wherein said adjustable-setting element is a variable resistor comprising a movable slider connected to said shutter-speed setting means and at least one resistance element which is contactable by said slider and by which a certain range of resistance values in certain steps may be inserted into said power supply regulation circuit.

3. Data recording means as claimed in claim 2, which includes a plurality of said resistance elements, by each of which with respect to other said resistance elements a different range of resistance values in different steps may be inserted into said power supply regulation circuit, wherein one resistance element of said plurality of resistance elements is selectively inserted into said power supply regulation circuit in accordance with the sensitivity to light of said film material.

4. Data recording means as claimed in claim 1, wherein said power supply adjustment circuit comprises a transistor element rate of current flow through which determines rate of power supply to said light source and said variable-setting element controls base bias to said transistor element.

5. Data recording means as claimed in claim 1, wherein said power supply circuit closure means is constituted by a normally open switch means included in said circuit, said switch means being closed upon arrival of said shutter means at a certain point during said exposure action of said shutter means.

6. Data recording means as claimed in claim 1, wherein said power supply circuit further includes a preheating power supply circuit which is normally open and may supply power at a low rate of supply to said light source, wherein said power supply circuit closure means comprises a first normally open switch means, which when actuated closes said preheating power supply circuit, and a second normally open switch means which when actuated closes said power supply adjustment circuit and said first switch means and said second switch means being successively closed during said exposure action of said shutter means.

* * * * *